Dec. 22, 1970   M. J. BRIENZA ET AL   3,549,256
LASER PULSE COMPRESSION RANGING SYSTEM USING
DOUBLE-CHIRPED PULSES
Filed Nov. 19, 1968                           2 Sheets-Sheet 1

INVENTORS
MICHAEL J. BRIENZA
EDMOND B. TREACY
BY
Donald F. Bradley
ATTORNEY

Dec. 22, 1970      M. J. BRIENZA ET AL      3,549,256
LASER PULSE COMPRESSION RANGING SYSTEM USING
DOUBLE-CHIRPED PULSES
Filed Nov. 19, 1968                 2 Sheets-Sheet 2

United States Patent Office 3,549,256
Patented Dec. 22, 1970

---

3,549,256
LASER PULSE COMPRESSION RANGING SYSTEM USING DOUBLE-CHIRPED PULSES
Michael J. Brienza and Edmond B. Treacy, Vernon, Conn., assignors to United Aircraft Corporation, East Hartford, Conn., a corporation of Delaware
Filed Nov. 19, 1968, Ser. No. 777,045
Int. Cl. G01c 3/00
U.S. Cl. 356—4                                9 Claims

ABSTRACT OF THE DISCLOSURE

A double-chirped laser pulse is generated by a pair of laser oscillators by use of a rotating mirror. The pulse is transmitted toward a target, and the pulse echo is detected and filtered. The resultant signal then modulates a radio frequency carrier wave in a balanced modulator, carrier suppressed circuit. The modulated R.F. signal is then compressed by a standard pulse compression network to produce a narrow pulse having a range resolution corresponding to twice the bandwidth of the original laser pulse.

BACKGROUND OF THE INVENTION

Field of invention

This invention relates to radar ranging systems for determining the distance of a target, and particularly to an optical ranging system in which a laser pulse is transmitted toward a target.

Another aspect of this invention relates to the generation of a double-chirped laser pulse, i.e., a pulse which contains both a linear negative frequency sweep and a linear positive frequency sweep.

Description of the prior art

Very short optical pulses can be generated by present Q-switching and mode-locking techniques. However, only a very small amount of energy can be realized in such short pulses for use in optical radar systems even if the pulses are amplified through the highest gain systems presently available. Components are damaged or destroyed if higher power pulses are attempted.

Considerably more energy can be transmitted to the target in a pulse if a much longer time duration pulse, e.g. a few microseconds, can be transmitted and the pulse echo subsequently compressed to yield the range resolution of a shorter pulse of a few nanoseconds duration. This increase in energy would also greatly increase the signal-to-noise ratio of the received pulse by a factor equal to the compression ratio of the system.

Pulse compression systems are known in the microwave radar field, but none are available for the high frequencies of optical pulses. Optical radar systems are presently of considerable interest due to the large bandwidths and short pulse capabilities of lasers.

SUMMARY OF THE INVENTION

A primary object of this invention is to provide an improved optical ranging system by using pulse compression techniques.

In accordance with the present invention, a double-chirped laser pulse is generated and transmitted toward a target. The pulse echo is detected by a square-law photodetector to produce a signal proportional to the light power. The resulting signal then amplitude modulates a radio frequency carrier wave in a balanced modulator, suppressed carrier circuit in which the bandwidth of the amplitude modulated wave is twice that of the original laser oscillator. The amplitude modulated wave is then compressed in time by a conventional compression network, and then displayed on a standard oscilloscope.

The video detection of the chirped optical frequency pulse echo maintains the integrity of the modulation which is at radio frequencies and thus enables standard electrical components and pulse compression techniques to be used, and as much as twice the bandwidth of the laser is impressed on the pulse envelope spectrum affording maximum use of the available bandwidth of the laser system.

Another object of this invention is the generation of a double-chirped optical pulse.

In accordance with this aspect of the invention, a rotating mirror is connected to vary the length of the resonant cavities of two lasers, increasing the length of one and decreasing the length of the other simultaneously. The length variation in the resonant cavity produces a frequency varied or chirped pulse from each laser. The two chirped pulses are superimposed by an arrangement of mirrors into a single output pulse having double-chirped frequency characteristics.

The invention permits the use of the full bandwidth characteristics of lasers in an optical radar, and enables the chirped pulses and pulse compression techniques of microwave radar to be used with pulses of optical frequencies. An optical radar system with extremely high resolution capabilities is thus described.

DESCRIPTION OF THE PREFERRED EMBODIMENT

Figure 1:
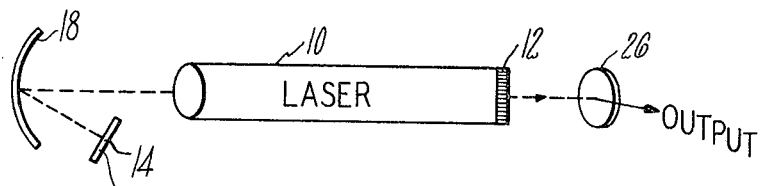
FIG. 1 is a view in elevation of apparatus for producing a double-chirped laser pulse.
Figure 2:
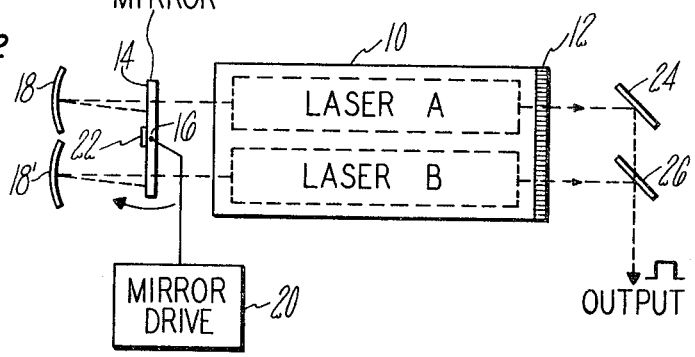
FIG. 2 is a plan view of the apparatus of FIG. 1.

Referring to FIGS. 1 and 2, there is shown apparatus for generating a double-chirped laser pulse.

A chirped pulse is one in which the carrier frequency is swept or changed with time during the time of the pulse. Chirped pulses are well known in the microwave radar field. The advantages of chirped pulses reside in the increase in resolution they provide, and specifically in the extra phase information capability resulting from the quadratic part of the phase shift, enabling more information to be obtained on the structure of the laser target.

The generation of a chirped optical pulse is disclosed and claimed in a copending patent application entitled "Optical Chirp Pulse Generator," Ser. No. 777,002, filed on even date in the name of Edmond B. Treacy. Reference may be made to this copending application for details of single chirped optical pulse generation. Briefly, pulses of light are generated by a laser oscillator, and one of the resonator mirrors is rotated in such a way as to continuously change the oscillator cavity length and therefore the oscillator frequency during the generation of the laser pulse.

A double-chirped optical pulse is one which contains both positive and negative linear frequency sweep components at the same time. Apparatus for accomplishing the production of a double-chirped laser pulse is shown in FIGS. 1 and 2 which are respectively elevation and plan views of the same apparatus.

Two separate laser tubes A and B are positioned side by side to form a laser tube assembly 10. Attached to one end of the laser tube assembly is a flat mirror 12 which acts as one of the feedback mirrors of a resonator cavity. The other feedback mirror for the resonant cavity is rotating mirror 14 which is adapted for rotation about an axis 16 shown in FIG. 2. A pair of spherical mirrors, 18 and 18', are positioned at one end of the resonant cavity and act to focus the laser feedback radiation from each laser upon the appropriate portion of the rotating mirror 14 as will be described. Mirror 14 is rotated by means of a mirror drive motor 20.

The feedback path for the laser oscillator including laser A comprises the top portion of rotating mirror 14, mirror 18 and through laser A to the top portion of mirror 12 as shown by the dotted lines. Mirror 12 is slightly transmitting, permitting coupling from the laser.

The feedback path for the laser oscillator including laser B is the bottom portion of rotating mirror 14, spherical mirror 18' and through laser B to the bottom portion of mirror 12. The output from this laser oscillator is a pulse passed through mirror 12 as shown.

As mirror 14 rotates, the length of the laser feedback cavity, that is, the distance between mirrors 12 and rotating mirror 14, changes continuously. This produces a sweeping of a Fabry-Perot mode across the laser gain profile, and results in a chirped output pulse. For the direction of the rotation shown, laser A will suffer a linear negative frequency sweep, and laser B will suffer a linear positive sweep.

The lasers A and B are preferably gas lasers such as carbon dioxide having relatively narrow spectral ranges. As a result, a single dominant mode can easily be isolated by proper selection of the feedback cavity mirror spacing. Specifically, the longitudinal mode spacing is equal to the speed of light divided by the round-trip transit time within the feedback cavity, or $c/2L$. For a mirror spacing of about 150 centimeters, the dominant Fabry-Perot mode spacing is about 100 mHz., and thus only one mode is within the gain band of the laser at any instant. For an offset of 1.3 centimeters between the axis of rotation 16 of the mirror 14 and the axes of the laser modes, and for a speed of rotation of mirror 14 of 1800 revolutions per minute, the dominant mode sweeps across the gain bandwidth of each laser in about 1 microsecond, and this determines the length of each output pulse. A more complete description of the theory of operation may be found in copending application Ser. No. 777,002.

The frequency sweep within the pulse from each laser is determined by a combination of Doppler shifts or successive reflections from the moving mirror, dispersion in the laser medium, and coupling between the cavity mode and all of its loss mechanisms.

The use of spherical reflectors 18 and 18' allows the generation of a series of pulses from each laser A and B. With proper alignment of the lasers and the feedback mirrors, the output pulses from lasers A and B will occur simultaneously. The output pulse from laser A impinges on a mirror 24 which is positioned to reflect the output pulse through a semitransparent mirror 26. Mirror 26 is positioned to reflect the output pulse from laser B and to pass the output pulse from laser A reflected from mirror 24. The two output pulses will be superimposed.

Figure 3:
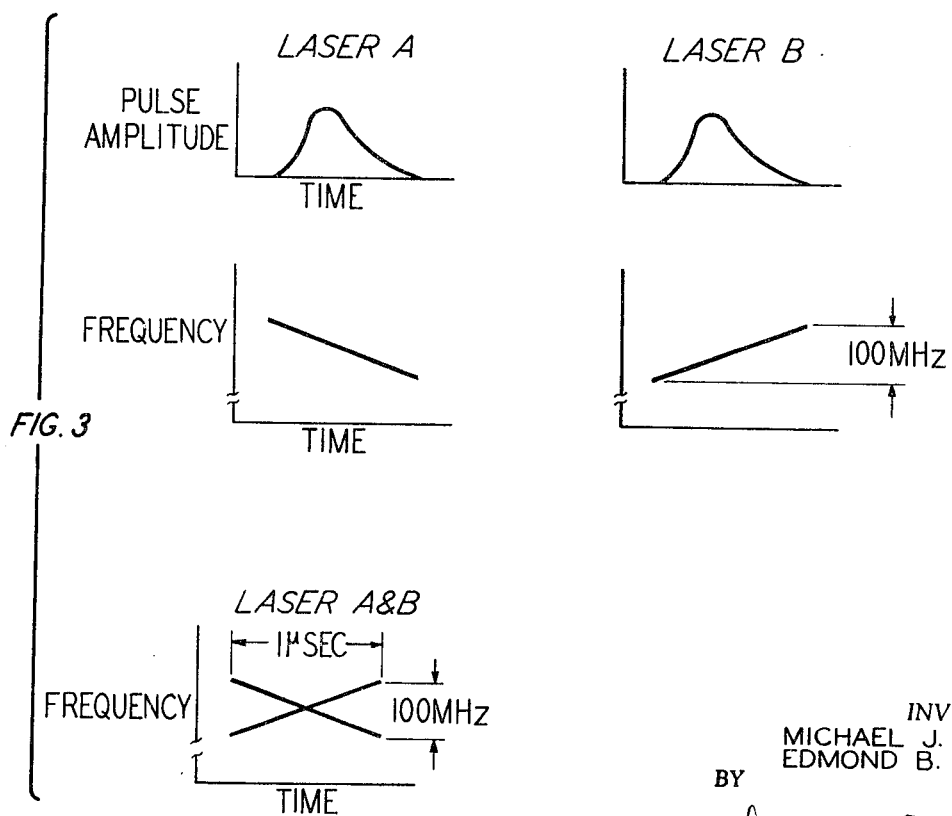
FIG. 3 shows graphically the pulse amplitude and frequency of the lasers in FIGS. 1 and 2.

FIG. 3 shows the pulse amplitude and frequency for each of the laser output pulses from lasers A and B. The pulse amplitude for each pulse is identical. Because of the direction of rotation of mirror 14, the frequency of the output pulse from laser A decreases with respect to time, whereas the output pulse from laser B increases in frequency.

Figure 4:
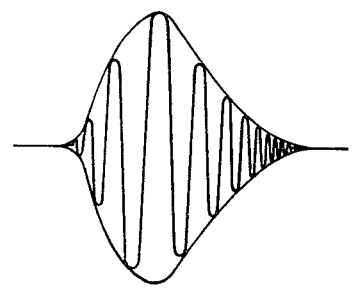
FIG. 4 shows the combined waveforms of lasers A and B.

The combination of the two chirped pulses is equivalent to an amplitude modulated pulse whose modulation bandwidth is even greater than the bandwidth of the laser system. When the two pulses interact, as when they strike a photodetector simultaneously, the combination of the linear frequency downsweep from laser A and the linear frequency upsweep from laser B is equivalent to a wave of constant carrier frequency amplitude modulated with a linearly varying modulation frequency. This is shown in FIG. 4 where the envelope of the amplitude modulation component is illustrated. The amplitude modulation component starts off at a high frequency, and the frequency decreases until it theoretically reaches zero at the crossover point of the positive and negative linear frequency sweeps. Then the frequency of the amplitude modulation component increases. The amplitude modulation component is superimposed upon a carrier wave at optical frequency, not shown in FIG. 4. The equivalent amplitude modulation pulse can be described as follows. Assume that the rotating mirror 14 is rotating at such a rate that it produces an instantaneous frequency change in each component beam of $\omega_0 + \mu t$, where $\omega_0$ is the optical carrier frequency and $\mu$ the rate of change of the frequency. The quantity $\omega_0 + \mu t$ is more properly the rate of change of the phase $\phi$ since frequency is not a well-defined quantity in this case. The phase of each beam is given by $$\phi = \int \frac{d\phi}{dt} dt \phi, \quad (t) = \omega_0 t + \tfrac{1}{2}\mu t^2, \quad \phi_2(t) = \omega_0 t - \tfrac{1}{2}\mu t^2 + \alpha$$

where $\alpha$ is the phase difference between the two beams.

The electric vector $\Sigma$ of each beam can be written as $\Sigma_1 = A(t) \cos \phi_1(t)$, $\Sigma_2 = A(t) \cos \phi_2(t)$ where $A(t)$ is the pulse envelope function determined largely by the laser line profile, the mirror velocity and the geometry of the laser cavity.

The combined signal of the two beams when they interact at the detector is then proportional to $$A^2(t)[1 + \cos(\mu t^2 - \alpha)]$$

The instantaneous frequency is shown in FIG. 3 for a laser with a bandwidth of 100 mHz.

Figure 5:
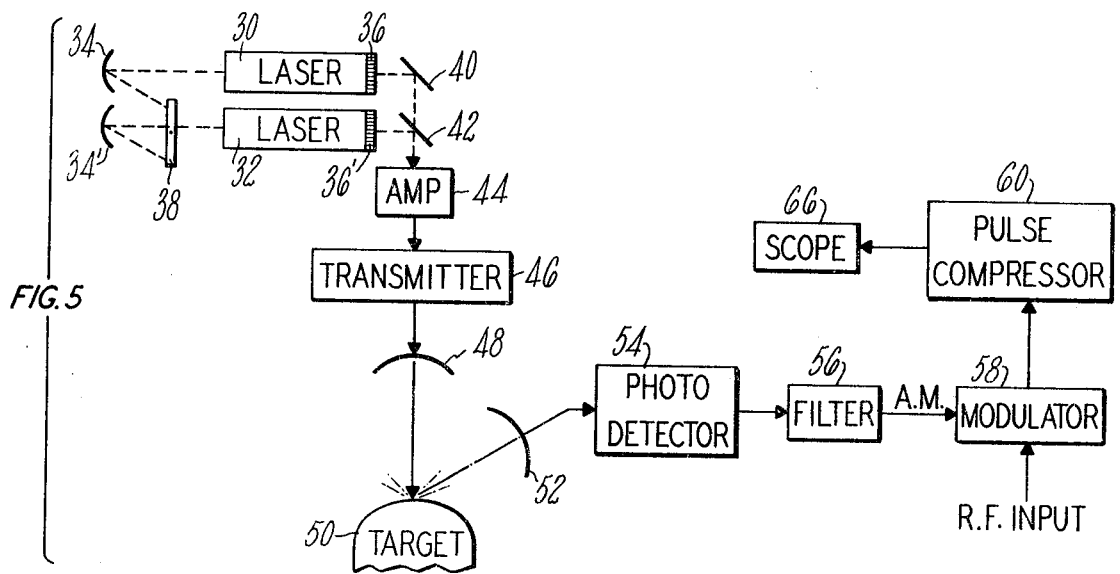
FIG 5 shows schematically an optical ranging system using a double-chirped laser pulse.

FIG. 5 shows the ranging radar system which utilizes the double-chirped pulses described previously. In FIG. 5, lasers 30 and 32 are inserted in resonant cavities comprising spherical mirrors 34 and 34' and 36 and 36'. A rotating mirror 38 is positioned in a resonant cavity as illustrated in FIGS. 1 and 2. The output pulses from lasers 30 and 32 are superimposed by means of mirrors 40 and 42. The output thus consists of a double-chirped pulse as previously described. The pulse is amplified as necessary through amplifier 44 and fed to a transmitter 46 where the double-chirped pulse is transmitted through antenna 48 toward a target 50. The system thus far described is typical of any optical radar or ranging system except for the generation of the double-chirped pulse.

As in other radar systems, the transmitted pulse is scattered from target 50, and a portion of the energy is picked up by a receiving antenna 52 in the form of an echo pulse from a target. The echo pulse is fed to a photodetector 54 which converts the light pulse into an electrical signal.

Figure 6:
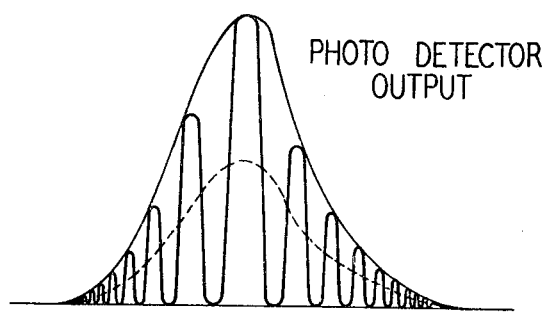
FIG. 6 shows the output waveform of the photodetector of FIG. 5.

Photodetector 54 is a square law detector in which the output current is proportional to the intensity of the echo pulse. The output of the photodetector is shown in FIG. 6. The photodetector may be a photodiode or any other instantaneous power detector. The detector output contains a DC signal plus an AC signal proportional to the modulation envelope of the intensity of the echo pulse.

The detected voltage, which is proportional to $$A^2(t)[1 + \cos(\mu t^2 - \alpha)]$$

is passed through a high pass filter 56 having a low cutoff frequency so that the signal proportional to $A^2(t)$ will be suppressed relative to that which is proportional to $A^2(t) \cos(\mu t^2 - \alpha)$.

The amplitude modulation signal is then used to modulate a convenient R.F. carrier frequency, for example 300 mHz., in a balanced modulator, carrier suppressed circuit 58. Balanced modulators are well known in the art, and need not be described in detail here. Generally, a carrier voltage is applied to the grids of two tubes in the same phase while the modulating signal is applied in opposite phase to the two tubes by means of a center tapped transformer. The sideband components generated in the two tubes are of opposite phase. Hence, the sidebands do appear in the outut. Four-diode bridge circuits are also well known.

The effect of suppressing the carrier of a sinusoidally modulated wave is to produce a modulated output having a resulting envelope which varies at twice the modulation frequency and possesses an apparent phase that reverses each time the modulating signal goes through zero.

The circuits described above are sometimes referred to as double-sideband, suppressed carrier modulators. Since upper and lower sidebands are passed by the modulator, the spectral characteristics shown in FIG. 2 transform to those of FIG. 7. If the high frequency carrier voltage is denoted by $B \cos \Omega t$, the modulator output is proportional to $$A^2(t)B[\cos (\Omega t - \mu t^2 + \alpha) + \cos (\Omega t + \mu t^2 - \alpha)]$$

The first term represents a signal with negative frequency sweep over a range equal to twice the laser bandwidth.

Figure 7:
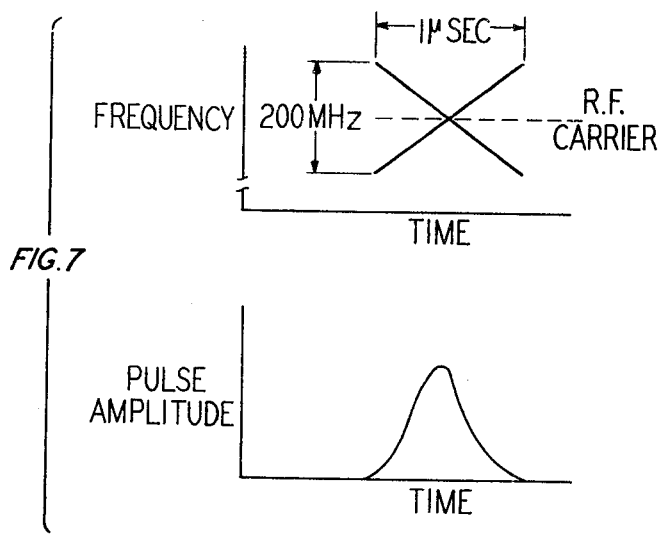
FIG. 7 shows the frequency and amplitude of the output of the modulator in FIG. 5.

The carrier suppressed amplitude modulated signal is then fed to a pulse compressor 16 which has a group delay that increases linearly with frequency. Pulse compressors of this type are well known and are commercially available. The portion of the pulse shown in FIG. 7 which increases in frequency will increase in amplitude by the square root of the compression ratio. This portion of the pulse is shown at 62 in FIG. 8. The portion of the pulse which decreases in frequency as shown in FIG. 7, and is represented by the second term of the last equation, will double in length in passing through the same network and its amplitude will be reduced by a factor of $\sqrt{2}$. This portion of the pulse is shown at 64 in FIG. 8. The entire pulse is displayed on a typical radar screen or scope 66.

The output from the pulse compression filter 60 will have an amplitude function which is the Fourier transform of $A^2(t)$ represented by $$g(t') = \int A^2(t) e^{-i\mu t t'} dt$$

The width of this pulse can easily be computed.

Figure 8:
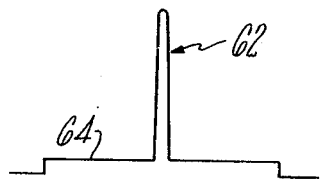
FIG. 8 shows the modulated pulse form after compression.

Utilizing chirped pulses from a standard carbon dioxide laser, the pulses shown in FIG. 8 will have a width of between 5 and 25 nanoseconds. This is in contrast to the one microsecond envelope of the oscillator pulse. If the bandwidth of the laser is also increased such as by pressure broadening, the pulse width of the compressed pulse will aso be correspondingly reduced.

The basic problem solved by this invention is that of obtaining high resolution in range with optical pulse radar. By using the double-chirped pulses and the frequency sweeping techniques, the full bandwidth of the laser is impressed on the pulse envelope spectrum providing maximum use of the available bandwidth of the laser system.

The radar range is increased by the same factor that would be gained by increasing the transmitter power of a standard system by the pulse compression ratio. These problems have previously been solved in microwave radar, but not in optical radar systems.

It is to be understood that the invention is not limited to the specific embodiment herein illustrated and described, and may be used in other ways without departure from the scope of the invention as defined by the following claims.

We claim:

1. Apparatus for generating a double-chirped optical pulse comprising:

first and second laser oscillators including a resonant cavity for each of said laser oscillators, said resonant cavity including means for simultaneously varying the optical length of each said resonant cavity, one of said resonant cavities increasing in length while the other said resonant cavity decreases in length, and means for combining the outputs from each of said laser oscillators.

2. Apparatus as in claim 1 in which said means for varying the length of said resonant cavities includes a rotating mirror mounted for rotation about an axis substantially perpendicular to the optical axes of said first second laser oscillators.

3. Apparatus as in claim 2 in which said first and second laser oscillators are parallel to each other, said rotating mirror being a portion of the resonant cavity of each of said laser oscillators and having its axis of rotation between the optic axes of said laser oscillators.

4. An optical ranging system comprising:

means for generating a double-chirped optical pulse, means for transmitting said pulse toward a target, receiving means for receiving an echo of said pulse reflected from said target, modulator means for modulating a radio frequency carrier wave with at least a portion of said echo pulse to produce a carrier suppressed amplitude modulated output signal, and means for time compressing said output signal to produce thereby a narrow pulse having a range resolution corresponding to twice the bandwidth of the optical pulse.

5. An optical ranging system as in claim 4 and including photodetector means connected with said receiving means for converting said optical pulse echo into an electrical signal, and means for separating the amplitude modulation components from said echo pulse, said amplitude modulation components being fed to said modulator means to modulate said carrier wave.

6. An optical ranging system as in claim 5 in which said separating means is a low pass filter circuit having a low cut-off frequency whereby the carrier frequencies of said echo pulse are suppressed.

7. An optical ranging system as in claim 4 in which said modulator means is a double-sideband, suppressed carrier modulator producing a modulated output signal at twice the modulation frequency.

8. An optical ranging system as in claim 4 in which said means for generating a double-chirped optical pulse comprises:

first and second laser oscillators including a resonant cavity for each of said laser oscillators, said resonant cavity including means for simultaneously varying the length of each said resonant cavity, one of said resonant cavities increasing in length while the other said resonant cavity decreases in length, and means for combining the outputs from each of said laser oscillators.

9. An optical ranging system comprising:

means for generating a double-chirped optical pulse, means for transmitting said pulse toward a target, receiving means for receiving an echo of said pulse reflected from said target, photodetector means for converting said echo pulse into an electrical signal, filter means for removing the carrier frequencies from said electrical signal and passing only the amplitude modulation components of said electrical signal, a balanced modulator having a radio frequency carrier wave applied thereto, means for feeding said amplitude modulation components to said balanced modulator to produce a carrier suppressed amplitude modulated output signal, and a pulse compression circuit for compressing said output signal whereby a narrow pulse having a range resolution corresponding to twice the bandwidth of the optical pulse is produced.

References Cited

UNITED STATES PATENTS 3,363,248  1/1968  Nicodemus _____ 343—17.2

OTHER REFERENCES

Compression of Optical Pulses, J. A. Giordmaine et al., IEEE Journal of Quantum Electronics, vol. QE–4, No. 5, May 1968, pps. 252–255.

Mode Locking Opens Door to Picosecond Pulses, A. J. De Maria, Electronics, vol. 41, pps. 112–122, Sept. 16, 1968.

RODNEY D. BENNETT, Primary Examiner

J. P. MORRIS, Assistant Examiner

U.S. Cl. X.R.

331—94.5; 343—17.2